US007851002B2

(12) United States Patent
Hekal et al.

(10) Patent No.: US 7,851,002 B2
(45) Date of Patent: Dec. 14, 2010

(54) METHODS FOR PRESERVING FRESH PRODUCE

(75) Inventors: Ihab M. Hekal, Greenwich, CT (US); Chao Chen, Shrewsbury, MA (US); Xiaoling Dong, North Attleboro, MA (US)

(73) Assignee: Mantrose-Haeuser Company, Inc., Attleboro, MA (US)

( * ) Notice: Subject to any disclaimer, the term of this patent is extended or adjusted under 35 U.S.C. 154(b) by 0 days.

(21) Appl. No.: 12/749,113

(22) Filed: Mar. 29, 2010

(65) Prior Publication Data

US 2010/0203200 A1 Aug. 12, 2010

Related U.S. Application Data

(63) Continuation of application No. 10/447,199, filed on May 28, 2003, now abandoned.

(60) Provisional application No. 60/386,574, filed on Jun. 7, 2002, provisional application No. 60/440,196, filed on Jan. 15, 2003.

(51) Int. Cl.
*A23F 5/00* (2006.01)
(52) U.S. Cl. .............. 426/310; 426/257; 426/268; 426/270; 426/302; 426/321; 426/327
(58) Field of Classification Search .......... 426/257, 426/268, 270, 302, 310, 321, 327
See application file for complete search history.

(56) References Cited

U.S. PATENT DOCUMENTS

| | | | |
|---|---|---|---|
| 2,153,487 A | 4/1939 | Sharma | |
| 2,791,508 A | 5/1957 | Rivoche | |
| 3,754,938 A | 8/1973 | Ponting | |
| 3,764,348 A | 10/1973 | Huxsoll et al. | |
| 3,888,224 A | 6/1975 | Okuhara et al. | |
| 4,006,257 A | 2/1977 | Kolk | |
| 4,011,348 A | 3/1977 | Farrier et al. | |
| 4,818,549 A * | 4/1989 | Steiner et al. | 426/267 |
| 4,882,190 A | 11/1989 | Olson et al. | |
| 4,883,679 A | 11/1989 | Sewon | |
| 4,960,600 A | 10/1990 | Kester et al. | |
| 4,988,522 A | 1/1991 | Warren | |
| 5,055,313 A | 10/1991 | Warren | |
| 5,126,153 A | 6/1992 | Beck | |
| 5,198,254 A | 3/1993 | Nisperos-Carriedo et al. | |
| 5,202,140 A | 4/1993 | Perera et al. | |
| 5,280,042 A | 1/1994 | Lopes | |
| 5,376,391 A | 12/1994 | Nisperos-Carriedo et al. | |
| 5,389,389 A | 2/1995 | Beck | |
| 5,919,507 A | 7/1999 | Beelman et al. | |
| 5,922,382 A | 7/1999 | Powrie et al. | |
| 5,925,395 A | 7/1999 | Chen | |
| 5,939,117 A * | 8/1999 | Chen et al. | 426/267 |
| 5,955,004 A | 9/1999 | Moreno | |
| 6,159,521 A | 12/2000 | Horn et al. | |
| 6,403,134 B1 | 6/2002 | Nayyar et al. | |
| 6,500,476 B1 | 12/2002 | Martin et al. | |
| 6,749,875 B2 * | 6/2004 | Selleck | 426/270 |
| 2002/0054950 A1 | 5/2002 | Selleck | |

FOREIGN PATENT DOCUMENTS

| | | |
|---|---|---|
| DE | 3624035 | 2/1987 |
| EP | 0316293 A1 | 5/1989 |
| EP | 0515764 | 12/1992 |
| EP | 1153901 A2 | 11/2001 |
| ES | 2092446 | 11/1996 |
| FR | 1088365 | 3/1955 |
| GB | 772062 | 4/1957 |
| GB | 1455986 | 11/1976 |
| GB | 2100575 | 1/1983 |
| JP | 57174067 | 10/1982 |
| JP | 62-048335 | 3/1987 |
| JP | 01160451 | 6/1989 |
| JP | 01221445 | 8/1989 |
| JP | 03015341 | 1/1991 |
| JP | 04148643 | 5/1992 |
| JP | 06046795 | 2/1994 |
| JP | 06506116 | 7/1994 |
| JP | 07322862 | 12/1995 |
| JP | 08298958 | 11/1996 |
| JP | 1121590 | 8/1999 |
| JP | 2000219880 | 8/2000 |
| JP | 2000342170 | 12/2000 |
| WO | 9217070 | 10/1992 |
| WO | 94/12041 | 6/1994 |
| WO | 97/23138 | 7/1997 |
| WO | 00/30460 | 6/2000 |
| WO | 01/64041 | 9/2001 |

OTHER PUBLICATIONS

Supplemental European Search Report, Mar. 18, 2002.
Pathamanaban, G et al., "Postharvest Preservation of Vegetables Using Fused Calcium Salts", Madras Agric. J., vol. 81, No. 8, pp. 460-461, 1994.

(Continued)

*Primary Examiner*—N. Bhat
(74) *Attorney, Agent, or Firm*—Calfee, Halter & Griswold, LLP

(57) ABSTRACT

The present invention pertains to methods of preserving fresh produce with a produce preservative which extends the shelf life of fresh produce, particularly cut fresh produce. The produce preservative preserves the texture, flavor, appearance, crispness, and color of the fresh produce, particularly the exposed surface of the fresh produce. The method comprises the following steps: providing a solution of produce preservative comprising: water, magnesium ions or zinc ions or tin ions; and ascorbate ions, or erythorbate ions; wherein the magnesium ion or zinc ions or tin ions and ascorbate ions are present in a mole ratio of preferably from 0.2:1 to 8:1, more preferably from 0.75:1 to 8:1, more preferably from 1:1 to 4:1, most preferably 1.5:1 to 3:1, applying said produce preservative to the produce; applying said produce preservative to the produce.

15 Claims, No Drawings

OTHER PUBLICATIONS

Isumi, H. et al., "Calcium Treatment to Maintain Quality of Zucchini Squash Slices", Journal of Food Science, vol. 60, No. 4, pp. 789-793, 1995.

Wong, et al., "Calcium Alginate Films: Thermal Properties and Permeability to Sorbate and Ascorbate", Journal of Food Science, vol. 61, No. 2, 1996, pp. 337-341.

Wong, et al., "Gas Exchange in Cut Apples with Bilayer Coatings", Agricultural and Food Chemistry, Oct. 1994, pp. 2278-2285.

Wong, et al., "Development of Edible Coatings for Minimally Processed Fruits and Vegetables", Edible Coatings and Films to Improve Food Quality, Editors Krochta et al., 1994 (Chapter 3).

Camirand, et al., Abstract No. 65 for "treatment for Sliced Avacados to Reduce Discoloration", 1994 Western Regional ACS Meeting and Pacific Conference, Oct. 19-22, 1994.

Sapers, et al., "Heated Ascorbic/Citric Acid Solution as Browning Inhibitor for Pre-Peeled Potatoes", Journal of Food Science, vol. 60, No. 4, 1995, pp. 762-776.

Ahvenainen, et al., New Approaches in Improving the Shelf Life of Minimally Processed Fruit and Vegetables, Trends in Food Science and Technology, Jun. 1996, vol. 7, pp. 179-187.

Gunes, et al., "Color of Minimally Processed Potatoes as Affected by Modified Atmosphere and Antibrowning Agents", Journal of Food Science, vol. 62, No. 3, 1997, pp. 572-575.

Sapers, et al., "Control of Enzymatic Browning in Apple with Ascorbic Acid Derivatives, Polyphenol Oxidase Inhibitors, and Complexing Agents", Journal of Food Science, vol. 54, No. 4, 1989, pp. 997-1002.

Pizzocaro et al., "Inhibition of Apple Polyphenoloxidase (PPO) by Ascorbic Acid, Citric Acid and Sodium Chloride", Journal of Food Processing and Preservation, 17 (1993), pp. 21-30.

Monsalve-Gonzalez et al., "Inhibition of Enzymatic Browning in Apple Products by 4-Hexylresorcinol", Food Technology, vol. 49, No. 4, Apr. 1995, pp. 110-117.

Monsalve-Gonzalez et al., "Control of Browning During Storage of Apple Slices Preserved by Combined Methods. 4-Hexylresorcinol as Anti-Browning Agent", Journal of Food Science, vol. 58, No. 4, 1993, pp. 797-826.

Lozano-De-Gonzalex, et al., "Enzymatic Browning Inhibited in Fresh and Dried Apple Rings by Pineapple Juice", Journal of Food Science, vol. 58, No. 2, 1993, pp. 399-404.

Bolin, et al., "Storage Stability of Minimally Processed Fruit" Journal of Food Processing and Preservation, 13 (1989) 281-292.

Database WPI Section Ch, Week 199702 Derwent Publications Ltd., Londion, GB, AN 1997-014144 XP0021291824 & ES 2 092 446 A (Papanova SL) Nov. 16, 1996.

King, Jr., et al., "Physiological and Microbiological Storage Stability of Minimally Processed Fruit and Vegetables", Food Technology, Feb. 1989, pp. 132-135.

Conway, et al., "The effects of postharvest infiltration of calcium, magnesium or strontium on decay, firmness, respiration, and ethylene production in apples", J. Am. Soc. Hort. Sci., 1987, 112:300.

Hepler, et al., "Calciium and plant development", Ann. Rev. Plant Physiol., 1985, 36:397.

Taketoshi Kajita, Dictionary of sitology for cooking, Asakura Publishing Co., Ltd., Nov. 25, 1994, first edition, p. 188.

Office Action from Japanese Patent Application No. 2004-511757, mailed Jun. 30, 2009.

Supplemental European Search Report from Application No. EP 03 73 1568, dated May 4, 2005.

International Preliminary Examination Report from International Application No. PCT/US03/17721, dated Feb. 16, 2005.

Examination Report from Application No. EP 03 731 568.6, dated Sep. 4, 2006.

International Search Report from International Application No. PCT/US03/17721, date of mailing Feb. 20, 2004.

Written Opinion from International Application No. PCT/US03/17721, date of mailing Aug. 24, 2004.

\* cited by examiner

METHODS FOR PRESERVING FRESH PRODUCE

This application is a continuation of U.S. patent application Ser. No. 10/447,199, filed May 28, 2003 now abandoned. This application claims priority to provisional U.S. Application Ser. No. 60/386,574 filed Jun. 7, 2002, and provisional U.S. Application Ser. No. 60/440,196 filed Jan. 15, 2003; both of which are fully incorporated herein by reference.

BACKGROUND OF THE INVENTION

Fresh produce rapidly deteriorates particularly when the flesh of the fruit or vegetable is exposed, such as by peeling the or by slicing the produce. The appearance, flavor, texture, and crispness rapidly degrades. Within hours, produce, such as apples, begin to turn brown and lose their distinctive flavor. The produce loses its texture and firmness; the produce becomes soft and loses its characteristic crispness.

Many methods of preservation involve cooking, which changes flavor and texture; typically appearance is also changed. Freezing substantially preserves flavor; however, texture and crispness are affected. Furthermore, frozen foods need to be continually stored and require freezers for storage. Drying often preserves flavor, but texture, crispness and appearance are substantially affected. Refrigeration helps to preserve crispness, texture and flavor for a limited number of hours, but does not prevent browning. Chemical preservatives are often used alone or in conjunction with these methods of preserving; however, they typically leave a residual taste.

One method employs four active ingredients: an acidulant such as citric acid; a metal sequesterant or chelant, such as sodium acid polyphosphate; an enzyme inhibitor such as calcium chloride; and an antioxidant such as ascorbic acid. However, the fruit has an unpleasant taste and the produce typically turns brown within 5 days.

Citric acid, which is present in lemon juice, has been used to delay browning in fruits; however, the fruit tastes sour, becomes soft and soggy, and typically the fruit turns brown within hours.

Sodium ascorbate has also been used to preserve fruit; while the color degradation is delayed, the fruit has a noticeable taste.

Other methods often involve forming a film on the surface of the fruit; however such films often leave an unacceptable gummy feel when eaten.

It would be desirable to have a method for preserving produce, particularly cut produce, which preserves the appearance, color, texture crispness and flavor, yet does not leave an after taste nor require cooking, drying or freezing.

SUMMARY OF THE INVENTION

The present invention pertains to methods of preserving fresh produce with a produce preservative which extends the shelf life of fresh produce, particularly cut fresh produce. The produce preservative preserves the texture, flavor, appearance, crispness, and color of the fresh produce, particularly the exposed surface of the fresh produce. The method comprises the following steps: providing a solution of produce preservative comprising: water, magnesium ions or zinc ions or tin ions or mixtures thereof, and ascorbate ions, or erythorbate ions; wherein the ascorbate ions, and the magnesium ion or zinc ions or tin ions, are present in a ion ratio of preferably from 0.2:1 to 8:1, more preferably 0.75:1 to 8:1, even more preferably from 1:1 to 4:1, most preferably 1.5:1 to 3:1; applying said produce preservative to the produce.

The produce preservative solution contains preferably from 0.02% to a saturated solution, more preferably from 0.02% to 30%, even more preferably from 0.05 to 20%, even more preferably from 0.2% to 10%, yet more preferably from 0.5% to 8%, most preferably from 0.6% to 5%, by weight, magnesium salt or zinc salt or tin salt; and preferably from 0% to 40%, more preferably from 0.1% to 40%, even more preferably from 0.1% to 30%, yet more preferably from 0.5% to 15%, most preferably from 1.0% to 5%, by weight, ascorbic acid or the stereo isomer of ascorbic acid, erythorbic acid.

Preferably the produce is then stored at a temperature which will not freeze the produce; preferably the produce is stored at temperatures of between −6 to room temperature.

The invention also relates to fresh produce preserved with the produce preservatives.

DETAILED DESCRIPTION OF THE INVENTION

The present invention pertains to methods of preserving fresh produce, that is, uncooked fruit and vegetables with a fresh produce preservative which extends the shelf life of the fresh produce, particularly cut fresh produce. The produce preservative preserves the texture, flavor, appearance, crispness, color of the tree fruits, such as for example, avocado and pome fruits such as apples and pears. The preservative also preserves the texture, flavor, appearance, crispness, color of vegetables, particularly the following vegetable families: the Solcanaceae family, for example, potatoes, peppers, eggplants and tomatoes; the Alliaceae family, such as onions; and the Brassiaceae family also referred to as the Cruciferae family, for example cabbage; the Cucurbitaceae family, for example cucumbers; the Apiaceae family also referred to as the Umbelliferae family, for example celery; and the Compositae family, also referred to as the Asteraceae family, for example, lettuce. The produce preservative also preserves edible fungi of the Ascomycetes/Basidiomycetes classes, such as edible mushrooms. Unless other wise noted, the term "vegetable" shall include the edible fungi in addition to the conventional vegetables.

The method comprises the following steps: providing a solution of produce preservative comprising: water, magnesium ions or zinc ions or tin ions; and ascorbate ions or erythorbate ions, wherein the ascorbate ion or erythorbate ion, and the magnesium ions or zinc ions or tin ions, are present in a ion ratio of preferably from 0.2:1 to 8:1, and, applying such produce preservative to the produce. The produce preservative is applied using conventional techniques preferably for a time sufficient to coat the produce with the produce preservative. Suitable techniques are spraying, sprinkling and dipping. Preferably the produce is then stored at a temperature which will not freeze the produce; temperatures of −6° C. have been found not to freeze the apples. Preferably the produce is stored at temperatures of between −7 to room temperature, 20° C., more preferably −2 to 7° C., most preferably form 2 to 5° C. Fresh produce preserved with produce preservative which is stored at room temperature will maintain color, flavor, texture and taste, however after extended periods may have a microbial content that is not desirable.

The method inhibits freshly cut produce from browning; for example, when magnesium ascorbate is used, produce is typically prevented from browning for at least 1 week, preferably 2 weeks or more while maintaining the freshness, crispness, texture, color and flavor of the produce without any residual taste. The exact length of the period of preservation depends upon the initial produce quality, the species and the variety of the produce and growing conditions of the produce. The method of the present invention offers the advantage in that the preserved produce may be stored under standard atmospheric pressure and standard atmospheric conditions; that is, the method does not require that the produce be stored under vacuum or inert atmosphere. The method of preserving produce does not require that the food be cooked, dried or frozen. The method offers the advantage in that it does not require preservatives such as sulfites. However, after the produce is preserved with the produce preservative, it may be dried or freeze-dried for use such as, for example, food or potpourri; the produce preservative will further delay the browning that eventually occurs in dried and freeze dried produces. In the event that such dried or freeze dried produce is reconstituted, the produce will be less brown than had the produce not been preserved with the produce preservative.

The Produce Preservative

The produce preservative is preferably a solution which contains: water; a cation which is either a magnesium ion, tin ion or zinc ion or mixtures thereof; and ascorbate ions or erythorbate ions or mixtures thereof. The source of the magnesium ion is, preferably, a magnesium hydroxide or a magnesium salt or a mixture thereof. Suitable magnesium salts are, for example, magnesium ascorbate, magnesium erythorbate, magnesium chloride, magnesium carbonate, magnesium phosphate, magnesium oxide, magnesium acetate, magnesium gluconate, magnesium glycerophosphate, magnesium lacatate, and mixtures thereof.

The source of the zinc ion is, preferably, a zinc hydroxide or a zinc salt or a mixture thereof. Suitable zinc salts are, for example, zinc ascorbate, zinc erythorbate, zinc chloride, zinc carbonate, zinc phosphate, zinc oxide, zinc acetate, zinc gluconate, zinc glycerophosphate, zinc lactate, and mixtures thereof.

The source of the tin ion is, preferably, a tin hydroxide or a tin salt or a mixture thereof. Suitable tin salts are, for example, tin ascorbate, tin erythorbate, tin chloride, tin carbonate, tin phosphate, tin oxide, tin acetate, tin gluconate, tin glycerophosphate, tin lactate, and mixtures thereof.

The source of the ascorbate ion is ascorbic acid, erythorbic acid, or an ascorbate or erythorbate salt such as magnesium ascorbate, zinc ascorbate, tin ascorbate, or magnesium erythorbate, zinc erythorbate or tin erythorbate. Preferably magnesium ascorbate or tin ascorbate or zinc ascorbate is the source for both the zinc ion and the ascorbate ion.

When added to water the ascorbic acid disassociates at least partially into the ascorbate ion and a hydrogen ion. Similarly, the magnesium salt disassociates into the magnesium ion and the corresponding anion; the zinc salt disassociates into the zinc ion and the corresponding anion; and the tin salt disassociates into the tin ion and the corresponding anion. Where the magnesium ascorbate, magnesium erythorbate, zinc ascorbate, zinc erythorbate, tin ascorbate, or tin erythorbate is employed, the produce preservative may also be used in the dry form; in the dry form the produce preservative is preferably powdered or granular. Preferably, the dry form preservative contains at least 1%, more preferably at least 2%, even more preferably at least 4% most preferably at least 5% of the produce preservative.

The percentage of the dry ingredients, exclusive of water, in the produce preservative are preferably: from 1% to 100%, more preferably from 10% to 50%, even more preferably from 20% to 40%, most preferably from 15% to 35% of a magnesium salt or zinc salt or tin salt; where the magnesium salt or zinc salt or tin salt is a salt other than an ascorbate or erythorbate salt, there is preferably from 30% to 99%, more preferably 50% to 88%, more preferably from 60% to 85%, most preferably from 65% to 75% ascorbic acid. Where the salt is an ascorbate or erythorbate salt, ascorbic acid is not necessary and is not preferred.

Where the salt is magnesium chloride, or zinc chloride or tin chloride, the percentage of the dry ingredients, exclusive of water, in the produce preservative is preferably from 25% to 98%, more preferably from 40% to 80%, most preferably from 50% to 67%, ascorbic acid or erythorbic acid, and from 2% to 75%, more preferably from 10% to 35%, most preferably from 25% to 30%, magnesium chloride, zinc chloride or tin chloride.

Where the magnesium or zinc or tin source is magnesium hydroxide or zinc hydroxide or tin hydroxide, the percentage of dry ingredients, in the produce preservative is preferably from 30% to 98%, more preferably from 60% to 88%, most preferably from 80% to 85%, ascorbic acid, and from 2% to 70%, more preferably from 16% to 25%, most preferably from 12% to 20%, magnesium hydroxide, or zinc hydroxide or tin hydroxide.

Where the magnesium salt or zinc salt or tin salt is a carbonate, the percentage of dry ingredients, in the produce preservative is preferably from 40% to 96%, more preferably from 65% to 90%, most preferably from 70% to 85%, ascorbic acid or erythorbic acid and from 4% to 40%, more preferably from 15% to 25%, most preferably from 20% to 23%, magnesium carbonate or zinc carbonate or tin carbonate.

The produce preservative solution contains preferably from 0.02% to a saturated solution, more preferably 0.02 to 20%, more preferably from 0.225% to 15%, even more preferably from 0.375% to 6%, magnesium salt or zinc salt or tin salt; and preferably from 0.2% to 40%, more preferably from 0.5% to 20%, even more preferably from 1.0% to 10%, most preferably from 1.6% to 5%, ascorbic acid or the stereo isomer of ascorbic acid, erythorbic acid.

The produce preservative solution preferably has an ion ratio of ascorbate ion or erythorbate ion, to magnesium ion, zinc ion or tin ion, of from 0.2:1 to 8:1, more preferably from 0.75:1 to 8:1, more preferably from 1:1 to 4:1, most preferably 1.5:1 to 3:1.

The preferred embodiment of the produce preservative solution preferably has from 0.2% to saturated solution, more preferably from 0.2% to 35%, even more preferably from 1.5% to 20%, most preferably from 2.5% to 6% magnesium ion and ascorbate ion. The pH range of the produce preservative solution is preferably from 1 to 10, more preferably from 2 to 8, most preferably 3 to 7.5. The pH is adjusted if needed with conventional reagents such as for example, ascorbic acid, hydrochloric acid, sodium hydroxide, potassium hydroxide magnesium hydroxide or any food grade acid or alkali.

For the best taste, the produce preservative preferably does not have a chloride concentration greater than 35%, more preferably not greater than 15%, even more preferably not greater than 5%; even more preferably not greater than 1%, most preferably not greater than 0.1% by weight, excluding water.

Similarly, for the best taste, the produce preservative preferably does not have a sodium ion concentration greater than 10%; more preferably not greater than 1%; even more preferably not greater than 0.5%, yet preferably not greater than 0.3%, most preferably not greater than 0.1% by weight, excluding water.

The produce preservative preferably does not have a potassium ion concentration greater than 20%; more preferably not greater than 5%; more preferably not greater than 1%, even more preferably not greater than 0.3%, yet preferably not greater than 0.1%, most preferably not greater than 0.01% by weight, excluding water.

Preferably, the produce preservative does not have a concentration of citric acid, citrate ion, acetic acid, acetate ion, lactic acid, lactate ion, malic acid, malate ion, or other acids or acid ions, with the exception of ascorbic acid and erythorbic acid, greater than 35%, more preferably not greater than 15%, more preferably not greater than 5%, more preferably not greater than 0.5%, more preferably not greater than 0.3%, yet more preferably not greater than 0.1%; most preferably not greater than 0.01% by weight, excluding water.

Again, for best taste, the produce preservative solution does not have a metal ion sequestrant, particularly an acidic polyphosphate metal ion sequestrant or chelant concentration greater than 5%, more preferably not greater than 2%, even more preferably not greater than 0.5%, yet more preferably not greater than 0.1%; most preferably not greater than 0.01%, by weight.

Preferably the produce preservative solution does not have a sulfite concentration greater than 5%, more preferably not greater than 2%, even more preferably not greater than 0.5%, yet more preferably not greater than 0.1%; most preferably not greater than 0.01% by weight. Sulphites include, for example, sodium metabisulphate, potassium metabisulphite, sodium bisulphite, sodium disulphite, and calcium bisulphite.

The produce preservative solution preferably does not have a flavonoid, rose hips, or pineapple juice concentration greater than 5%, more preferably not greater than 2%, more preferably not greater 0.5%, more preferably not greater than 0.1%; even more preferably not greater than 0.01%, even more preferably not greater than 0.005%, most preferably not greater than 0.001% by weight.

It is also preferred that the produce preservative solution lacks agents which affect the "mouth feel" of the cut vegetable and impart a waxy or slippery feel to the vegetable, such as gelling agents, film forming agents, waxes, gums, polysaccharides, such as hydroxymethyl cellulose, methyl cellulose, microcrystalline cellulose, alginates, carrageenans, lipids, pectins, modified starches, locust bean gum, xanthum gum, gellan gum, guar gum, and tragacaths. The preservative solution preferably does not have a concentration of such an agent greater than 5%, more preferably not greater than 2%, even more preferably not greater than 0.5%, yet more preferably not greater than 0.1%; most preferably not greater than 0.01% by weight.

It is also preferred that the produce preservative solution does not have a lecithin, emulsifier, protein, or individual amino acids, such as cysteine, more specifically L-cysteine, concentration greater than 5%, more preferably not greater than 2%, more preferably not greater than 0.5%, yet more preferably not greater than 0.1%; most preferably not greater than 0.01%, by weight.

Preferably the produce is not treated with other preservatives containing: chloride ion; sodium ion; potassium ion; citric acid; citrate ion; acetic acid; acetate ion; lactic acid; lactate ion; malic acid; malate ion; or other acids or acid ions, with the exception of ascorbic acid and erythorbic acid; metal ion sequestrant, particularly an acidic polyphosphate metal ion sequestrant or chelant; sulfite; flavonoid; rose hips; pineapple juice; or lecithin; emulsifier; protein; or individual amino acids, such as cysteine, more specifically L-cysteine; gelling agents; film forming agents; waxes; gums; polysaccharides; such as hydroxymethyl cellulose; methyl cellulose; microcrystalline cellulose; alginates; carrageenans; lipids; pectins; modified starches; locust bean gum; xanthum gum; gellan gum; guar gum; and tragacaths; either before, during or after being preserved with the produce preservative, particularly in the concentrations noted above.

The Method of Preserving Produce with the Produce Preservative

The fresh produce is preferably first sanitized to reduce or eliminate microorganisms on the surface of the skin. Good results have been obtained using a 50-150 ppm sodium hypochlorite solution. The produce is then processed such as for example, by paring, slicing, coring, dicing, peeling or a combination thereof; and then the produce preservative is applied. The produce preservative is applied, preferably at ambient temperature, by conventional techniques such as spraying, dipping, sprinkling, tossing, immersing or drenching. Dipping involves immersing the produce into a solution of produce preservative and is generally preferred. Good results have been obtained by dipping produce 1-5 minutes. Longer dipping times can also be employed.

The produce is then preferably placed in conventional packaging to prevent or reduce drying of the produce, particularly if it is not to be consumed within several hours, such as where the produce is to be transported or displayed on a shelf. The produce is then preferably placed in package to prevent or reduce drying where the produce is to be transported or sitting on a shelf.

Preferably the produce is stored at a temperature which will not freeze the produce; for example, temperatures of −6° C. have been found not to freeze the apples. Preferably the fresh produce is preferably stored at below 30° C., more preferably below 25° C., even more preferably below 10° C., even more preferably below 5° C., to reduce microbial growth. While the produce may be stored at ambient temperatures around 20° C., shelf life is increased by storing below 20° C., preferably below 10° C. The produce is preferably stored above 0° C. Preferably the produce is stored at temperatures of between −7 to room temperature, that is 20° C., more preferably −2 to 7° C., most preferably from 2° to 5° C.

Preferably the produce is not frozen, cooked or canned before, during, or after being preserved with produce preservative. Where the produce is to be eaten it is preferably not dried before, during, or after being preserved with produce preservative.

Evaluation of Preserved Produce

As a result of being preserved with produce preservative, the degradation of the color of the produce is substantially reduced.

The firmness or hardness of the fruit is the force required for a probe to penetrate the fruit a given distance into the fruit. The firmness is determined using a Quality and Test System 25 and TA 40 probe from Stevens Company. The TA 40 probe a black acetate, 4.5 mm diameter, 20 mm long rod probe having a flat end. The following settings were employed in the QTS system: the test type is a compression test of one cycle, 0 second hold time, 0 second recovery, 5 g trigger point, 30 mm/min test speed, target unit distance, and a target value of 3 mm. The apple pieces were 1 cm thick.

The texture, flavor, and moistness of the fruit were evaluated by tasting fruit samples. The color and/or appearance was also evaluated by visual inspection. The color, texture, moistness and flavor were then evaluated according to a scale of either 1 to 10, with 10 being the value assigned to a freshly cut piece of comparative fruit or vegetable. A value of less than 7 is not acceptable.

The following mixtures containing the dry ingredients of the produce preservatives are typical Examples and not intended to be limiting.

While certain cations, for example tin, may not suitable for preserving produce that is to be eaten, they may be suitable for preserving produce used in potpourris and crafts, particularly where such produce is dried.

Methods of Preserving Fresh Produce Using the Produce Preservative

Example 1

Red Delicious apples were preserved with the produce preservative. First, the whole apples free from blemishes or bruises were rinsed with tap water, sanitized with 100 parts per million of sodium hypochlorite solution for one minute, then peeled, cored, and sliced. The slices were immersed in water for 30 to 120 seconds.

A produce preservative solution was prepared containing 2.25% ascorbic acid and 0.25% MgO. The apple slices were dipped into the produce preservative solution for 1 to 2 minutes. The apples were then removed from the solution and drained for one to two minutes. The apple slices were placed in 2 mil polyethylene bags, and stored at 2-5° C. The apple slices were evaluated several times over a 14 day period. The appearance specifically the color, of the apples was scored on a scale of 1-10, 10 being the best. A score which is lower than 7 is not acceptable, that is it developed significant browning.

For comparison, similarly prepared apple slices were placed in one of several control preservatives. The first preservative solution was a 2.5% w/v aqueous solution of calcium ascorbate. The second preservative solution was a 5% by weight per volume solution of calcium ascorbate.

The results are shown in Table 1.

Example 2

Red delicious apples were preserved as in Example 1, except that the apple slices were dipped into a preservative solution containing 4.5% ascorbic acid and 0.5% MgO. The results are shown in Table 1.

Example 2a

The procedure of example 2 was repeated except that moistness, texture color and flavor were evaluated at 5 days. The results are shown in Table 2.

Example 3

Red delicious apples were preserved as in Example 1, except that the apple slices were dipped into a preservative solution containing 2.175% ascorbic acid and 0.325% ZnO. The results are shown in Table 1.

Example 4

Red delicious apples were preserved as in Example 1, except that the apple slices were dipped into a preservative solution containing 4.35% ascorbic acid and 0.65% ZnO. The results are shown in Table 1.

TABLE 1

Evaluation of Sliced Apples Preserved with Produce preservative

| Treatment | Day 1 30 minutes | Day 2 | Day 8 | Day 15 |
|---|---|---|---|---|
| Untreated apple slices Color | Less than 7 | Less than 7 | | |
| Untreated apple slices Firmness (grams) | — | — | — | — |
| Example 1 Color | | 8.89 | 6.88 | 6.125 |
| Example 1 Firmness (grams) | 1705 | 1286 | | 1160 |
| Example 2 Color | | 9.78 | 9.125 | 8.125 |
| Example 2 Firmness (grams) | 1531 | 1187 | | 1136 |
| Example 3 Color | | 9.78 | 7.5 | 4.5 |
| Example 3 Firmness (grams) | 1496 | 1164 | | 1060 |
| Example 4 Color | | 10 | 8.0 | 5 |
| Example 4 Firmness (grams) | 1466 | 1183 | | 946 |
| Comparative Solution 1 Color | | 9.89 | 9.63 | 9 |
| Comparative Solution 1 Firmness (grams) | 1635 | 1271 | | 1340 |
| Comparative Solution 2 Color | | 10 | 10 | 10 |
| Comparative Solution 2 Firmness (grams) | 1704 | 1271 | | 1497 |

TABLE 2

Evaluation of Sliced Apples Preserved with Produce Preservative

| | Color | Flavor | Texture | Moistness |
|---|---|---|---|---|
| Example 2a magnesium ascorbate | 8.4375 | 8.25 | 7.9375 | 8.4375 |
| comparative solution | 9 | 8.375 | 8.5625 | 8.3125 |

*Score 10 is the best. Score which is lower than 7 is not acceptable.

Example 5

Bartlett pears were preserved as in Example 1, except that the pear slices were dipped into a preservative solution containing 4.5% ascorbic acid and 0.5% MgO. Also, the only comparative solution was control was a 7% ascorbic acid solution. The pear slices were evaluated for color. The results are shown in Table 3.

Example 6

Hass avocadoes were preserved as in Example 1, except that the avocado slices were dipped into a preservative solution containing 5.8% ascorbic acid and 4.2% $MgCl_2 \cdot 6H_2O$. Also, the control was a 10% solution of calcium ascorbate. The avocado slices were evaluated for color. The results are shown in Table 3.

Example 7

Hass avocadoes were preserved as in Example 1, except that the avocado slices were dipped into a preservative solution containing 8.7% ascorbic acid and 6.3% $MgCl_2 \cdot 6H_2O$. Also, the control was a 10% solution of preservative 1. The avocado slices were evaluated for color. The results are shown in Table 3.

TABLE 3

Appearance of Sliced Pears and Avocadoes Preserved with Produce Preservative

| Solution | Day 1 4 hours | Day 2 | Day 7 |
|---|---|---|---|
| Pears untreated | Less than 7 | — | — |
| Ascorbic acid | | 9 | 5.5 |
| Example 5 | | 10 | 10 |
| Avocadoes Untreated | Less than 7 at 1-2 hours | — | — |
| Comparative Calcium ascorbate | | 9.5 | 8.5 |
| Example 6 | | 9.5 | 6 |
| Example 7 | | 10 | 9.5 |

Example 8

Celery was washed with tap water to remove dirt and soil, then sanitized with 100-150 parts per million sodium hypochlorite water for 1 minute. The celery was drained and cut into three inch by 0.25 to 0.3 sticks. The celery was again sanitized with 75 parts to 100 parts per million sodium hypochlorite water for 1 minute. The celery sticks were immersed in a preservative solution containing 4.8 grams ascorbic acid and 0.54 grams magnesium oxide in 100 ml water, to provide magnesium ascorbate solution having an ascorbate ion:magnesium ion molar ratio of 2:1 and a pH of 5.02. The celery was immersed into the preservative solution for 2-3 minutes and drained for 2-3 minutes. The celery sticks were packed in 3 mil polyethylene bags which were heat sealed and then stored at 2-5° C.

Untreated sticks were used as controls. Also, for comparison, sticks were treated with a calcium ascorbate solution containing 4.8 grams ascorbic acid and 1.2 grams calcium carbonate; the molar ratio of ascorbate ion:calcium ion was 2:1. The celery sticks were evaluated visually for color. The results are shown in Table 4.

Example 9

Celery was preserved as in Example 8, except that the celery slices were dipped into a preservative solution containing 4.8% ascorbic acid and 0.74 grams ZnO, to provide a zinc ascorbate solution having an ascorbate ion to zinc ion molar ratio of 3:1, and a pH of 4.15. The results are shown in Table 4.

TABLE 4

Color of Sliced Celery Preserved with Produce Preservative

| Treatment | Day 2 | Day 6 | Day 10 |
|---|---|---|---|
| Untreated celery | 8 | 6 | 6 |
| Comparative | 9.25 | 8 | 6 |
| Example 8 | 8.75 | 7 | 6 |
| Example 9 | 8.25 | 3 | 2 |

Example 10

Iceberg lettuce, with exterior damaged leaves removed, was washed with tap water to remove dirt and soil, then sanitized with 100-150 parts per million sodium hypochlorite water for 1 minute. The lettuce was drained 3-5 minutes and cut into 1 by 1 inch pieces. The lettuce was immersed in into a preservative solution containing 4.0 grams ascorbic acid and 0.95 grams magnesium carbonate to provide a magnesium ascorbate solution having an ascorbate ion to magnesium ion molar ratio of 2:1, and a pH of 4.74. The lettuce was immersed into the preservative solution for 30 to 60 seconds, then drained for 2-3 minutes and then spun in a salad spinner. The lettuce pieces were packed in 3 mil polyethylene bags which were heat sealed and then stored at 2-5° C. The results are shown in Table 5.

Example 11

Iceberg lettuce was preserved as in Example 10, except that the lettuce slices were dipped into a preservative solution containing 4.0 grams ascorbic acid and 0.30 grams magnesium oxide in 100 ml water, to provide a magnesium ascorbate solution having an ascorbate ion to magnesium ion molar ratio of 3:1, and a pH of 4.15. The results are shown in Table 5.

Example 12

Iceberg lettuce was preserved as in Example 10, except that the lettuce slices were dipped into a preservative solution containing 4.0 grams ascorbic acid and 0.46 grams zinc oxide in 100 ml water, and having an ascorbate ion to zinc ion molar ratio of 4:1, and a pH of 3.90. The results are shown in Table 5.

TABLE 5

Color of Sliced Lettuce Preserved with Produce Preservative

| | Day 3 | Day 7 | Day 9 | Day 11 | Day 14 |
|---|---|---|---|---|---|
| Control Lettuce | 6 | 6 | 4 | 4 | 4 |
| Example 10 | 9.5 | 9.5 | 9.5 | 9.5 | 8 |
| Example 11 | 9.5 | 9.5 | 9.5 | 9.25 | 8 |
| Example 12 | 5 | 5 | 3 | 2 | 2 |

Example 13

Russet potatoes were washed with tap water to remove dirt, peeled then cut into 0.5 by 0.5 inch pieces. The potatoes were rinsed with tap water to remove surface starch and drained for 2-3 minutes. The potato pieces were then immersed in a preservative solution containing 1.25 grams ascorbic acid, 0.75 grams citric acid and 1.12 grams $MgCl_2.6H_2O$ in 100 ml water, for 1-2 minutes. They were drained for 2-3 minutes, then packed in 3 mil polyethylene bags which were heat sealed. The bags were stored at 2-5° C.

For comparison a solution was prepared containing: 1.25 grams ascorbic acid, 0.75 grams citric acid, and 0.75 grams sodium chloride in 100 ml water. The results are shown in Table 6.

Example 14

Russet potatoes were preserved as in Example 13, except that the potato slices were dipped into a preservative solution containing 1.25 grams ascorbic acid, 0.75 grams citric acid and 0.75 grams zinc chloride in 100 ml water. The results are shown in Table 6.

TABLE 6

Color of Sliced Potatoes Preserved with Produce Preservative

|  | Day 2 | Day 3 | Day 5 | Day 8 | Day 12 |
|---|---|---|---|---|---|
| Untreated Potato | 5 | Less than 4 | Less than 4 | Less than 4 | Less than 4 |
| Comparative Solution | 9 | 9 | 9 | 8 | 8 |
| Example 13 | 8 | 8 | 8 | 8 | 6 |
| Example 14 | 8 | 6.5 | 3 | 3 | 3 |

Example 15

Russet potatoes were preserved as in Example 13, except that the potato slices were dipped into a preservative solution containing 4 grams ascorbic acid, and 1.07 grams magnesium chloride in 100 ml water. Untreated sliced potatoes were used as controls; no comparative solutions were used. The results are shown in Table 7.

Example 16

Russet potatoes were preserved as in Example 15, except that the potato slices were dipped into a preservative solution containing 4 grams ascorbic acid, and 0.45 grams magnesium oxide in 100 ml water. The results are shown in Table 7.

Example 17

Russet potatoes were preserved as in Example 15, except that the potato slices were dipped into a preservative solution containing 4 grams ascorbic acid, and 0.64 grams zinc oxide in 100 ml water. The results are shown in Table 7.

Example 18

Russet potatoes were preserved as in Example 15, except that the potato slices were dipped into a preservative solution containing 4 grams ascorbic acid, and 1.03 grams zinc chloride in 100 ml water. The results are shown in Table 7.

TABLE 7

Color of Sliced Potato Preserved with Produce preservative

| Formulas tested | Day 2 | Day 4 | Day 9 | Day 16 |
|---|---|---|---|---|
| Untreated Potato | 5 | 4 | 4 | 4 |
| Example 15 | 10 | 10 | 10 | 9.5 |
| Example 16 | 10 | 10 | 9 | 8 |
| Example 17 | 7 | 6 | 2 | 2 |
| Example 18 | 10 | 10 | 5 | 2 |

Example 19

Whole mushrooms were washed with a 0.25% sodium carbonate solution for 30 seconds to remove dirt and drained 20-30 seconds. The mushrooms were dipped into a preservative solution containing 4.0 grams ascorbic acid and 0.45 grams magnesium oxide in 100 ml water. Also, for comparison, mushrooms were treated with a calcium ascorbate solution containing 4 grams ascorbic acid and 0.75 grams calcium carbonate in 100 ml water. The results are shown in Table 8.

Example 20

Mushrooms were preserved as in Example 19, except that the mushrooms were dipped into a preservative solution containing 4.0 grams ascorbic acid and 0.30 grams magnesium oxide. The results are shown in Table 8.

Example 21

Mushrooms were preserved as in Example 19, except that the mushrooms were dipped into a preservative solution containing 4.0 grams ascorbic acid and 0.64 grams zinc oxide. The results are shown in Table 8.

TABLE 8

Color of Whole Mushrooms Preserved with Produce Preservative

| Treatment | Day 2 | Day 5 | Day 7 | Day 9 |
|---|---|---|---|---|
| Untreated mushroom | 8 | 7 | 7 | 7 |
| Comparative | 9.5 | 9 | 9 | 7 |
| Example 19 | 8 | 6 | 6 | 5 |
| Example 20 | 9 | 8.5 | 8.5 | 7.5 |
| Example 21 | 7 | 2 | 2 | 2 |

Example 22

Celery sticks were preserved as in Example 8, except that the celery sticks were dipped into a preservative solution containing 4.0 grams ascorbic acid and 1.07 grams magnesium chloride in 100 ml water. No comparative solution was used. The results are shown in Table 9.

Example 23

Celery sticks were preserved as in Example 8, except that the celery sticks were dipped into a preservative solution containing 4.0 grams ascorbic acid and 0.45 grams magnesium oxide in 100 ml water. The results are shown in Table 9.

Example 24

Celery sticks were preserved as in Example 8, except that the celery sticks were dipped into a preservative solution containing 4.0 grams ascorbic acid and 0.64 grams zinc oxide in 100 ml water. The results are shown in Table 9.

Example 25

Celery sticks were preserved as in Example 8, except that the celery sticks were dipped into a preservative solution containing 4.0 grams ascorbic acid and 1.03 grams zinc chloride in 100 ml water. The results are shown in Table 9.

TABLE 9

Color of Celery Preserved with Produce Preservative

| Formulas | Day 4 | Day 6 | Day 11 |
|---|---|---|---|
| Example 22 | 9.5 | 7 | 5 |
| Example 23 | 8 | 7 | 6 |
| Example 24 | 7 | 6 | 5 |
| Example 25 | 9 | 6 | 3 |
| Untreated celery | 9 | 6 | 6 |

Example 26

Russet potatoes were preserved as in Example 13, except that the potatoes were dipped into a preservative solution containing 4.0 grams ascorbic acid and 2.57 grams stannous chloride dihydrate. The results are shown in Table 10.

TABLE 10

Color of Potato Slices
Preserved with Produce Preservative

| Example | Day 2 | Day 6 | Day 8 | Day 12 |
| --- | --- | --- | --- | --- |
| Example 26 | 10 | 10 | 10 | 10 |
| Control | 5 | 4 | 4 | 4 |

What is claimed is:

1. A process for preserving fresh produce without adversely affecting the flavor of the fresh produce to any significant degree, the process comprising applying to the fresh produce an aqueous preservative consisting essentially of an anion selected from ascorbate, erythrobate or both and magnesium cations supplied to the aqueous preservative by magnesium hydroxide, magnesium oxide or a magnesium salt other than magnesium chloride, the molar ratio of ascorbate and erythrobate anions to magnesium cations being about 4:1 to 1:1, the aqueous preservative containing sufficient magnesium cations and ascorbate, erythrobate or both anions so that the produce is prevented from browning for at least about 1 week, the aqueous preservative containing no greater than about 0.1 wt % chloride ion based on the weight of the dry ingredients in the preservative, no greater than about 0.1 wt % acid anions other than ascorbate and erythrobate based on the weight of the dry ingredients in the preservative, and no more than about 0.1 wt. % metal ion sequestrant based on the weight of the aqueous preservative as a whole.

2. The process of claim 1, wherein the magnesium salt other than magnesium chloride is one or more of magnesium ascorbate, magnesium erythrobate, magnesium carbonate, magnesium phosphate, magnesium oxide, magnesium acetate, magnesium gluconate, magnesium glycerophosphate, and magnesium lactate.

3. The process of claim 1, wherein the aqueous preservative contains no more than about 0.1 wt. % sulphite ion based on the weight of the aqueous preservative as a whole.

4. The process of claim 3, wherein the aqueous preservative contains no greater than about 0.1 wt % sodium ion based on the weight of the dry ingredients in the preservative.

5. The process of claim 4, wherein the preservative contains less than about 5% flavonoid and less than 0.1% acidic polyphosphate metal ion sequestrant.

6. The process of claim 5, wherein the preservative contains less than 1% potassium ions, less than 0.5% of citric acid or citrate ions, and less than 0.5% malic acid and malate ions.

7. The process of claim 6, wherein the preservative contains less than 5% of film forming agents, lactic acid and cysteine.

8. The process of claim 3, wherein the aqueous preservative comprises about 0.1% to 30% magnesium ions and about 0.1% to 40% of ascorbate ions, erythrobate ions or both, the percents being based on the weight of the aqueous preservative.

9. The process of claim 7, wherein the preservative comprises from about 0.1% to 10% magnesium ions, from about 0.5% to 15% ascorbate ions, erythrobate ions or both, wherein the molar ratio of ascorbate and erythrobate ions to magnesium ions is about 1.5:1 to 3:1, and wherein the produce is a member of the Solcanaceae family, the Amaryllidaceae family, the Brassicaceae family, the Cucurbitaceae family, the Ascomycetes/Basidiomycetes classes or the tree fruits.

10. The process of claim 9 wherein the preservative comprises from about 0.1% to 3% magnesium ions, and from 1% to 10% ascorbate ions, erythrobate ions or both, wherein the produce is selected from the group consisting of peppers, onion, tomatoes, cucumbers, mushrooms, celery, potatoes, lettuce, apples, pears, avocadoes and mixtures thereof, wherein the produce is cut, and wherein the cut produce is not frozen, dried, cooked or canned after the aqueous preservative is applied.

11. The process of claim 6, wherein the aqueous preservative comprises about 0.1% to 30% magnesium ions and about 0.1% to 40% of ascorbate ions, erythrobate ions or both, the percents being based on the weight of the aqueous preservative.

12. The process of claim 5, wherein the aqueous preservative comprises about 0.1% to 30% magnesium ions and about 0.1% to 40% of ascorbate ions, erythrobate ions or both, the percents being based on the weight of the aqueous preservative.

13. The process of claim 4, wherein the aqueous preservative comprises about 0.1% to 30% magnesium ions and about 0.1% to 40% of ascorbate ions, erythrobate ions or both, the percents being based on the weight of the aqueous preservative.

14. The process of claim 3, wherein the aqueous preservative comprises about 0.1% to 30% magnesium ions and about 0.1% to 40% of ascorbate ions, erythrobate ions or both, the percents being based on the weight of the aqueous preservative.

15. A cut fruit of vegetable preserved according to the method of claim 1.

* * * * *